United States Patent
Dunn (10) Patent No.: US 8,223,449 B2
(45) Date of Patent: Jul. 17, 2012

(54) DISK DRIVE TRACK ADDRESS ENCODED WITH A SERVO SECTOR ADDRESS

(75) Inventor: Eric R. Dunn, Cupertino, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 12/851,534

(22) Filed: Aug. 5, 2010

(65) Prior Publication Data

US 2012/0033322 A1 Feb. 9, 2012

(51) Int. Cl.
*G11B 5/09* (2006.01)
*G11B 5/596* (2006.01)
(52) U.S. Cl. ............... 360/49; 360/48; 360/77.08
(58) Field of Classification Search .............. None
See application file for complete search history.

(56) References Cited

U.S. PATENT DOCUMENTS

| 5,589,998 | A | 12/1996 | Yu |
| 6,304,398 | B1 | 10/2001 | Gaub et al. |
| 6,751,774 | B2 | 6/2004 | Aziz |
| 6,831,808 | B2 * | 12/2004 | Ottesen et al. ............. 360/78.06 |
| 2009/0059777 | A1 | 3/2009 | Shepherd et al. |

* cited by examiner

*Primary Examiner* — Daniell L Negron
*Assistant Examiner* — Regina N Holder
(74) *Attorney, Agent, or Firm* — Patterson & Sheridan, LLP (57) ABSTRACT

A servo sector address and a track address of a recording medium of a disk drive are encoded into a combined address value. The combined address value is stored in a combined address field that has fewer bits than the total bits required to uniquely encode the servo sector address and the track address. The position of a transducer head, indicated by the servo sector address and the track address, is determined by reading encoded values from two consecutive servo sectors on the recording medium and then decoding the encoded values.

20 Claims, 4 Drawing Sheets

DISK DRIVE TRACK ADDRESS ENCODED WITH A SERVO SECTOR ADDRESS

BACKGROUND OF THE INVENTION

1. Field of the Invention

Embodiments of the present invention relate generally to disk drives and, more particularly, to systems and methods for encoding track and servo sector addresses in such drives.

2. Description of the Related Art

A disk drive is a data storage device that stores digital data in concentric tracks on the surface of a data storage disk. The data storage disk is a rotatable hard disk with a layer of magnetic material thereon, and data is read from or written to a desired track on the data storage disk using a transducer head, i.e., a read/write head, that is held proximate to the track while the disk spins about its center at a constant angular velocity.

To properly align the read/write head with a desired track during a read or write operation, disk drives generally use a closed-loop servo system that relies on servo data stored in servo sectors written on the disk surface when the disk drive is manufactured. These servo sectors form "servo wedges" or "servo spokes" from the outer to inner diameter of the disk, and are either written on the disk surface by an external device, such as a servo track writer, or by the drive itself using a self servo-writing procedure. The read/write head can be positioned with respect to the data storage disk by using feedback control based on servo information read from the servo wedges with the read element of the read/write head. The servo sectors provide position information about the radial and circumferential location of the read/write head with respect to the disk surface in the form of servo patterns.

A typical servo pattern consists of a preamble field used to synchronize the timing of the read channel and to adjust the signal amplitude, an area that provides track number and servo sector number used for coarse positioning of the read/write head, and servo bursts for fine positioning of the read/write head relative to a specific data storage track. The pattern typically includes a field for enumerating each servo sector and a field for enumerating each data storage track, where the servo sector number provides the circumferential position of the read/write head and the track number provides the radial position of the read/write head.

Due to the large number of servo sectors commonly found on a data storage disk, i.e., several hundreds, and the very large number of tracks found on a data storage disk, i.e., hundreds of thousands, fields enumerating the servo sector and track numbers occupy a significant portion of storage space on the disk that could otherwise be dedicated for user data. Because the information in these fields is largely redundant, with most bits remaining unchanged from track to track and from sector to sector, schemes have been developed in the art for minimizing the size of these fields In some schemes, the field for servo sector number is eliminated entirely and is replaced by an index bit that serves as an index mark to designate a particular servo sector for each track. The index bit is set to an index value, e.g., 1, for one servo sector per track, the index bit being set to a null value, e.g., 0, for all other servo sectors on the track. A significant drawback to this approach is that, when the position the of the read/write head is unknown, the time required to reestablish a known position of the read/write head is, on average, one half revolution of the disk. Because head location is frequently unknown during normal operation of a disk drive, for example whenever switching between surfaces of a drive, this is a significant drawback.

Other schemes combine the track address and servo sector address into a single smaller field. In some cases such schemes introduce ambiguities in the actual position of the read/write head, since a portion of the unique address information is sacrificed in order to reduce the size of the track address/servo sector address field. Positional ambiguity is highly undesirable in the context of reliability of disk drive performance. In other cases, such schemes have the added constraint that the position of the read/write head can only be determined when it is positioned on the same track for some number of servo sectors, which also increases the time necessary to determine head position.

In light of the above, there is a need in the art for a system and method of encoding track addresses and servo sector addresses so that a minimal portion of a disk drive storage medium is used while allowing head position to be quickly determined.

SUMMARY OF THE INVENTION

One or more embodiments of the present invention provide a system and method for encoding servo sector and track addresses of a disk drive recording medium together into a combined address value. The combined address value is stored in a combined address field that has fewer bits than the total bits required to uniquely encode the servo sector address and the track address. The position of a transducer head, indicated by the servo sector address and the track address, is determined by reading encoded values from two consecutive servo sectors on the recording medium and then decoding the encoded values.

A method of decoding a sector number and a track number of a recording medium of a disk drive based on encoded data written on servo sectors of the recording medium, according to an embodiment of the present invention, comprises the steps of consecutively reading first and second encoded data, the first encoded data from a first servo sector and the second encoded data from a second servo sector, decoding an S-bit sector number from the first and second encoded data, and decoding an L-bit track number from the first and second encoded data, wherein each of the first and second encoded data contains less than (S+L) bits.

A non-transitory computer-readable storage medium, according to an embodiment of the present invention, comprises instructions for causing a controller of a disk drive to carry out the steps of consecutively reading first and second encoded data written on servo sectors of a recording medium of the disk drive, the first encoded data from a first servo sector and the second encoded data from a second servo sector, decoding an S-bit sector number from the first and second encoded data, and decoding an L-bit track number from the first and second encoded data, wherein each of the first and second encoded data contains less than (S+L) bits.

A recording medium for a disk drive, according to an embodiment of the present invention, comprises a plurality of servo sectors each having a plurality of address fields, one for each track of the recording medium, wherein each address field contains an L-bit encoded data, the lower bits of which match lower bits of a track number of the track corresponding to the address field. The upper bits of the L-bit encoded data, however, do not match the upper bits of the track number.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
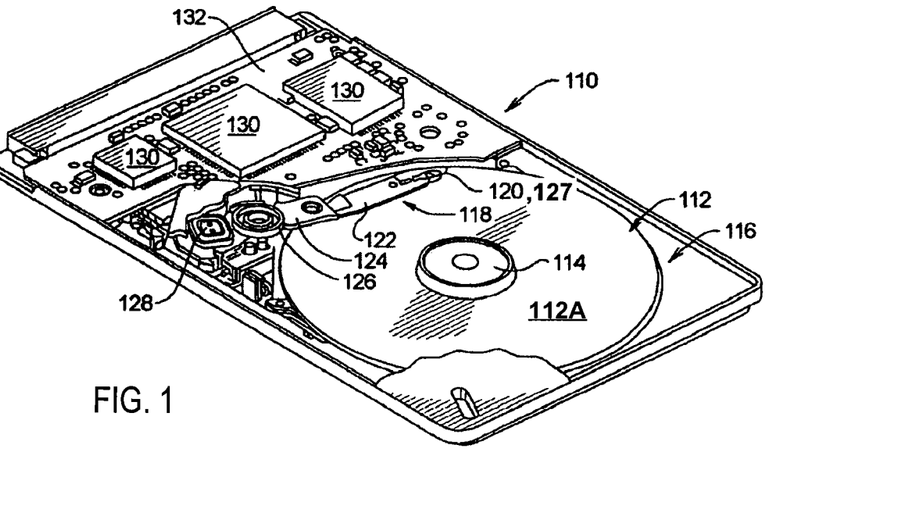
FIG. 1 is a perspective view of an exemplary embodiment of a disk drive.

FIG. 1 is a perspective view of an exemplary embodiment of a disk drive 110. For clarity, disk drive 110 is illustrated without a top cover. Disk drive 110 includes a storage disk 112 that is rotated by a spindle motor 114. Spindle motor 114 is mounted on a base plate 116. An actuator arm assembly 118 is also mounted on base plate 116, and has a slider 120 mounted on a flexure arm 122 with a read/write head 127. Flexure arm 122 is attached to an actuator arm 124 that rotates about a bearing assembly 126. Voice coil motor 128 moves slider 120 relative to storage disk 112, thereby positioning read/write head 127 over the desired concentric data storage track disposed on the surface 112A of storage disk 112. Spindle motor 114, read/write head 127, and voice coil motor 128 are coupled to electronic circuits 130, which are mounted on a printed circuit board 132. The electronic circuits 130 include a read channel, a microprocessor-based controller, and random access memory (RAM). For clarity of description, disk drive 110 is illustrated with a single storage disk 112 and actuator arm assembly 118. Disk drive 110 may also include multiple storage disks 112 and multiple actuator arm assemblies 118. In addition, each side of disk 112 may have an associated read/write head 127 coupled a flexure arm 122. The invention described herein is equally applicable to devices wherein the individual heads are configured to move separately some small distance relative to the actuator using dual-stage actuation.

Figure 2:
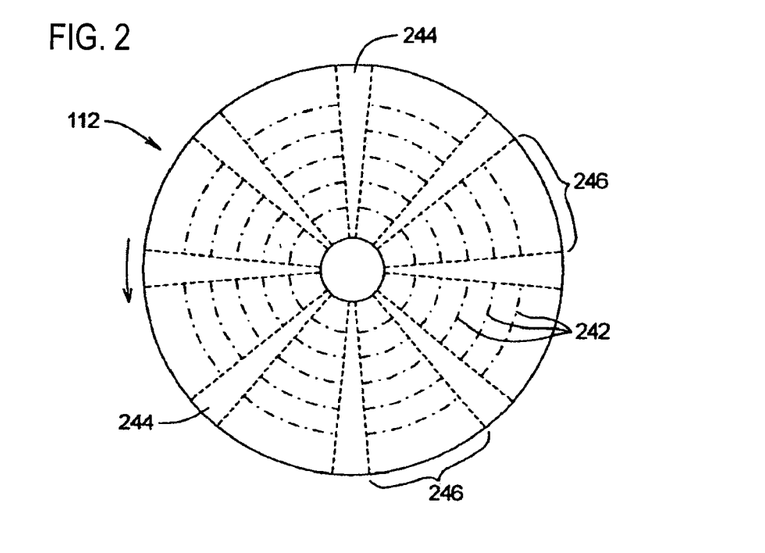
FIG. 2 illustrates a storage disk according to embodiments of the invention.

FIG. 2 illustrates storage disk 112 with data organized in a typical manner after servo wedges 244 have been written on storage disk 112 by either a media writer or by disk drive 110 itself via self servo-write (SSW). Storage disk 112 includes concentric data storage tracks 242 located in data sectors 246 for storing data. Concentric data storage tracks 242 are positionally defined by servo information written in servo wedges 244. Each of concentric data storage tracks 242 is schematically illustrated as a centerline, but in practice occupies a finite width about a corresponding centerline. Substantially radially aligned servo wedges 244 are shown crossing concentric data storage tracks 242 and include servo sectors containing servo information that defines the radial position and track pitch, i.e., spacing, of concentric data storage tracks 242. Such servo information includes a servo sector containing a reference signal that is read by read/write head 127 during read and write operations to position read/write head 127 above a desired track 242. Servo sectors are described in greater detail in conjunction with FIG. 3, below. In practice, servo wedges 244 may be somewhat curved, for example, configured in a spiral pattern. Typically, the actual number of concentric data storage tracks 242 and servo wedges 244 included on storage disk 112 is considerably larger than illustrated in FIG. 2. For example, storage disk 112 may include hundreds of thousands of concentric data storage tracks 242 and hundreds of servo wedges 244.

When disk drive 110 is in operation, actuator arm assembly 118 sweeps an arc between an inner diameter (ID) and an outer diameter (OD) of storage disk 112. Actuator arm assembly 118 accelerates in one angular direction when current is passed through the voice coil of voice coil motor 128 and accelerates in an opposite direction when the current is reversed, allowing for control of the position of actuator arm assembly 118 and attached read/write head 127 with respect to storage disk 112. Voice coil motor 128 is coupled with a servo system known in the art that uses positioning data read from storage disk 112 by read/write head 127 to determine the position of read/write head 127 over concentric data storage tracks 242. The servo system determines an appropriate current to drive through the voice coil of voice coil motor 128, and drives said current using a current driver and associated circuitry.

Figure 3:
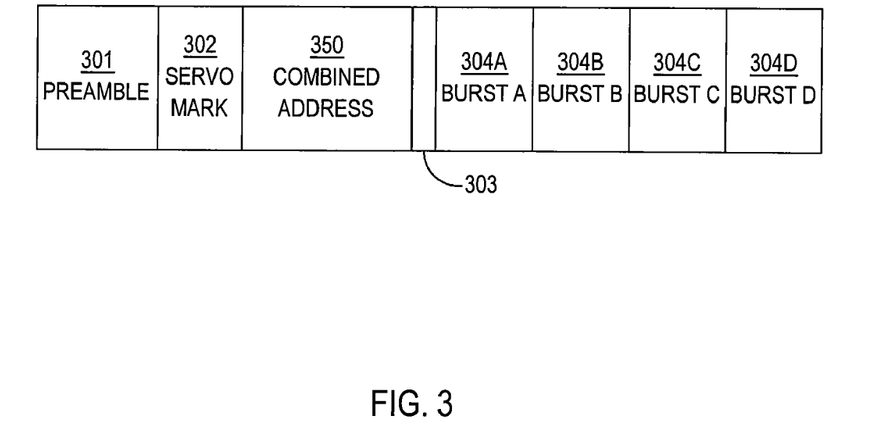
FIG. 3 is a schematic diagram of a servo sector disposed in a servo wedge, according to embodiments of the invention.

FIG. 3 is a schematic diagram of a servo sector 300 disposed in servo wedges 244, according to embodiments of the invention. Servo sector 300 is an exemplary illustration of servo sector formatting, and includes a preamble field 301, a servo mark field 302, a combined address field 350, a pad field 303, and servo burst fields 304A-304D. It is noted that the format of servo sector 300 is an exemplary illustration and the specific order of the different fields making up servo sector 300 may vary from the format described in FIG. 3 without departing from the scope of the invention. Preamble field 301 synchronizes the timing of the read channel and adjusts signal amplitude, servo mark field 302 includes information indicating a beginning of the servo area, and pad field 303 is included as a buffer between combined address field 350 and servo burst fields 304A-304D. Servo burst fields 304A-304D contain fine head positioning information for locating concentric data storage tracks 242. Several methods are well known in the art for implementing such fine positioning, including amplitude servo bursts or phase-encoded servo bursts, the method used depending on the demodulation system.

Combined address field 350 includes the servo sector address for servo sector 300 and the track address of the track on which servo sector 300 is disposed. According to embodiments of the invention, this information is combined into a single value, i.e., a combined address value, and stored in a field having fewer bits than the total bits in a servo sector address field sized for storing the servo sector address and a track address field sized for storing the track address. The servo sector address and the track address are reversibly combined into a combined address value in a way that allows the servo sector address and the track address to be unambiguously extracted by reading the combined address value for two locations on a disk, where the two locations are not necessarily on the same track. Thus, the position of read/write head 127 can be determined by reading the combined address value for two locations on a disk, which is significantly faster than waiting for storage disk 112 to rotate to the index bit.

Figure 4:
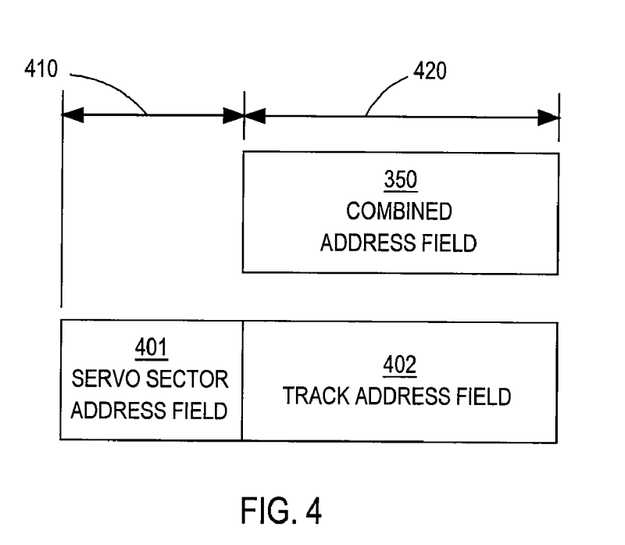
FIG. 4 schematically illustrates a comparison of a combined address field with a typical servo sector address field and a typical track address field.

FIG. 4 schematically illustrates a comparison of combined address field 350 with a typical servo sector address field 401 and a typical track address field 402. Servo sector address field 401 is a servo sector field sized to include the bit values for a servo sector address on storage disk 112. Since there are typically several hundred servo sectors in a disk drive, the bit length 410 of servo sector address field 401 is nine bits, which can accommodate 511 unique servo sector addresses in the preferred embodiment of this invention. Similarly, track address field 402 is a servo sector field that is sized to include the bit values for a track address on storage disk 112, and has a bit length 420 of 18 bits. As shown, the number of bits in combined address field 350 is substantially smaller than the sum of bit length 410 and bit length 420, thereby substantially reducing the size of servo sector 300 and consequently the portion of storage disk 112 occupied by servo wedges 244. In some embodiments, combined address field 350 may have a bit length as small as bit length 410 of track address field 402.

Figure 5:
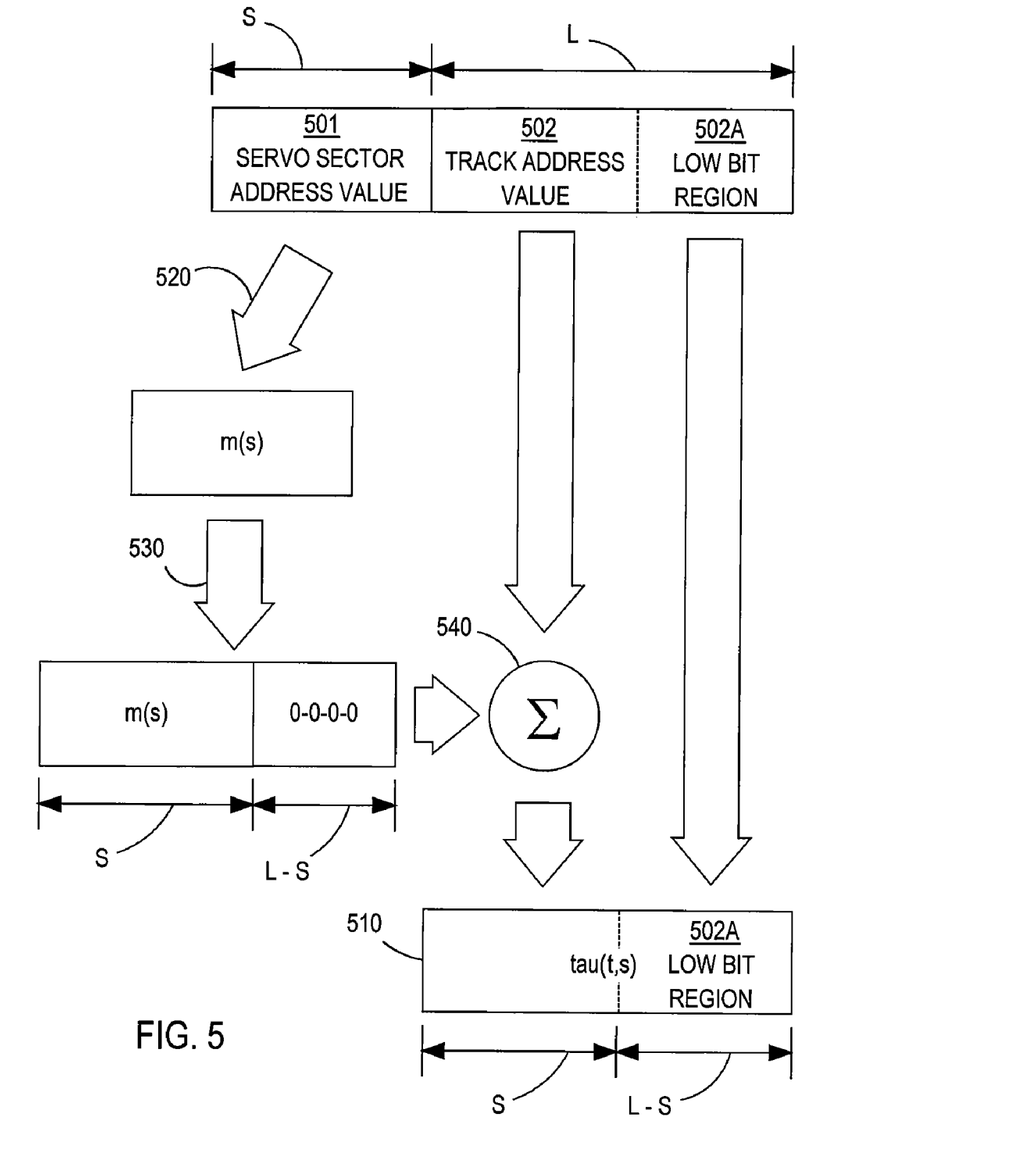
FIG. 5 is a block diagram conceptually illustrating the manner in which a combined address value is constructed from a servo sector address value and a track address value, according to embodiments of the invention.

FIG. 5 is a block diagram conceptually illustrating the manner in which a combined address value 510 is constructed from a servo sector address value 501 and a track address value 502, according to embodiments of the invention. Servo sector address value 501 is the address value for a particular servo sector on storage disk 112 and has a bit length equal to bit length 410 of servo sector address field 401, e.g., 9 bits. In the embodiment illustrated in FIG. 5, servo sector address value 501 has a bit length of S bits, where S is defined below in conjunction with Equation 1. Track address value 502 is the address value for a particular track on storage disk 112 and has a bit length equal to bit length 420 of track address field 402, e.g., 18 bits. In the embodiment illustrated in FIG. 5, track address value 502 has a bit length of L bits, where L is defined below in conjunction with Equation 3. In the exemplary embodiment described herein, combined address value 510 also has a bit length equal to bit length L. In other embodiments, combined address value 510 may have a bit length greater than bit length 420 as long as it is less than the total bit length of servo sector address field 401 and the track address field 402, without departing from the scope of the invention.

Initially, a "munged" sector number m(s) is computed from servo sector address value 501, as indicated by munge operation 520 in FIG. 5. Equation 1 explicitly describes munge operation 520 on servo sector address value 501, herein denoted s:

$$m(s) = \mod\left(\frac{(s+2c)(s+1)}{2}, 2^s\right) \quad (1)$$

where S is an integer large enough to satisfy the condition $s<2^S$ for all s, and c is a constant non-negative integer, described below. Thus, S may be equal to the number of servo sector bits, bit length 410. The term "munging," as used herein and applied to the operation described by Equation 1, means that information is being (imperfectly) transformed, and is not to be confused with the meaning of the term "munge" related to constructing a strong password through character substitution. In addition, the notation mod(a, b) used for the modulo operation herein is simply a convenient alternative to the notation "a modulo b" or "a mod b."

It is noted that Equation 1 defines m(s) so that Equation 2 is true for all s>0:

$$\mod [m(s)-m(s-1)-c, 2^S]=s \quad (2)$$

Thus for all s>0, the difference (i.e., modulo [$2^S$]) between consecutive munged sector numbers, i.e., m(s) and m(s−1), determines the sector number, and s can almost always be determined from two consecutive sector readings. The exceptional case is where s=0. Assuming that there are N servo sectors, numbered 0 to N−1, there is always a constant non-negative integer c, such that mod [m(0)−m(N−1)−c, $2^S$] is ≧N or 0. Thus, it is always possible to uniquely determine the sector number from the backward difference of consecutive munged sector numbers m(s) even when the sector number "wraps" from N−1 to 0. This property is an improvement over other known and patented methods.

Embodiments of the invention combine munged sector number m(s) and track address value 502 to produce combined address value 510 in a way that preserves the useful property of the backward difference illustrated by Equation 2. Equation 3 expresses the formula for computing combined address value 510, herein denoted tau(t,s), from munged sector number m(s) and track address value 502, herein denoted t:

$$tau(t,s)=\mod(t+2^{(L-S)}*m(s), 2^L) \quad (3)$$

where L≧S. In a preferred embodiment, L is an integer that equals the number of track address bits, i.e., bit length 420, but may also be a larger integer. Application of Equation 3 places the munged sector number m(s) in the upper bits of track address value 502, as denoted by bit-shift operation 530 and modulo addition operation 540 in FIG. 5, thereby leaving the lower bits of track address value 502, i.e., lower bit region 502A, uncorrupted. In a preferred embodiment, the resulting combined address is Gray coded and written to the media.

The definition of combined address value 510 as expressed by Equation 3 has several properties that allow servo sector address value 501 and track address value 502 to be determined when combined address value 510 is read from two consecutive sectors. Given a coarse estimate of the radial velocity of read/write head 127, the two consecutive sectors are not required to be on the same track. Any of well-known methods for estimating the radial velocity of read/write head 127 may be used. An estimated velocity of zero tracks per servo sector is usually sufficient since the radial velocity during a head switch is typically quite low. For an initial head load, the radial velocity is also typically low and a zero velocity estimate is usually sufficient. The back electro-motive force from the voice coil can provide a more refined estimate of the radial velocity. If it becomes necessary to reacquire the track address and sector number address during a high velocity seek, a typical implementation provides an estimate of the last known radial velocity.

A description is now provided for determining both track address value 502 and servo sector address value 501 from two consecutive observations of combined address value 510, i.e., tau(t2,s) and tau(t1,s−1), from two unknown tracks herein denoted t1 and t2 tau(t2,s) and tau(t1,s−1) may be observations from different concentric data storage tracks 242 on storage disk 112, assuming that an estimated radial velocity v at which read/write head 127 has moved between the first and second tracks, i.e., t1, t2, is within an acceptable range of the actual radial velocity. Specifically, if estimated radial velocity v (expressed in tracks/sector) is within $-2^{(L-S-1)}+1$ and $2^{(L-S-1)}$ of the actual radial velocity at which read/write head 127 has moved between the first and second tracks, then the computed track address value 502 and servo sector address value 501 will be correct. Considering that in typical embodiments L=18 and S=9, estimated radial velocity v is typically required to be within ±256 tracks/sector of the actual radial velocity of read/write head 127, which is not a difficult condition to meet. One of skill in the art will appreciate that producing a radial velocity estimate of this accuracy can be readily accomplished by a variety of means. For example, in one embodiment, a back electro-motive force from voice coil motor 128 turning inside the magnet can provide such an approximation. Thus, assuming that radial velocity v is correct, an expected combined address value 510, i.e., $tau_{exp}$, for cylinder t2 and sector s−1 can be expressed by Equation 4:

$$tau_{exp}(t2,s-1) = \text{mod }[s \text{ mod}(tau(t2,s) - (tau(t1,s-1)+v), 2^{(L-S)}) + (tau(t1,s-1)+v), 2^L] \quad (4)$$

where smod is the "signed modulo" operator. The signed modulo operator is defined by Equation 5:

$$smod(x, N) = \text{mod}\left(x + \frac{N}{2}, N\right) - \frac{N}{2} \quad (5)$$

and produces a value in the range −N/2, N/2−1 inclusive for integral x and even integral N. Thus, the signed modulo operator is substantially similar to the modulo operator, with the addition of an offset that provides both positive and negative differences.

Given a combined address value 510 from one track and an estimate of the combined address for that same track on the previous servo sector, the servo sector address value 501 can be determined with Equation 6:

$$s = \frac{\text{mod}[tau(t2, s) - tau_{exp}(t2, s-1) - c2^{(L-S)}), 2^L]}{2^{(L-S)}} \quad (6)$$

Track address value 502, i.e., t2, is computed using Equation 7:

$$t2 = \text{mod }[tau(t2,s) - 2^{(L-S)}m(s), 2^L] \quad (7)$$

Thus, both servo sector address value 501 and track address value 502 can be calculated from two consecutive observations of combined address value 510.

As noted above, the inventor has determined that there is always a constant non-negative integer c available, such that mod $[m(0)-m(N-1)-c, 2^S]$ is $\geq N$ or 0, where N is the number of sectors on a surface of storage disk 112. The constant c makes it possible to uniquely determine servo sector address value 501, i.e., s, from the backward difference of two consecutive munged sector number m(s), even when the sector number "wraps" from N−1 to 0. Equation 8 calculates one possible value for c:

$$c = \left\lfloor \frac{\text{mod}\left(\frac{n(n-1)}{2}, 2^S\right)}{2^S - N} \right\rfloor \quad (8)$$

where N is the number of sectors and S is the number of bits used to represent the sector number. Table 1 provides sample output from Equation 8 for N near 400, including the value of c computed and verification that the sector number formula works correctly at the wrap point from N−1 to 0.

TABLE 1

| No. of Sectors, N | No. Of Sector Number Bits, S | c | m(0) | m(N − 1) | Sector Number at Wrap mod(m(0) − m(N − 1) − c, 2^S) | Verification |
|---|---|---|---|---|---|---|
| 397 | 9 | 2 | 2 | 40 | 472 | TRUE |
| 398 | 9 | 1 | 1 | 41 | 471 | TRUE |
| 399 | 9 | 0 | 0 | 41 | 471 | TRUE |
| 400 | 9 | 3 | 3 | 104 | 408 | TRUE |
| 401 | 9 | 2 | 2 | 106 | 406 | TRUE |
| 402 | 9 | 1 | 1 | 107 | 405 | TRUE |
| 403 | 9 | 0 | 0 | 107 | 405 | TRUE |
| 404 | 9 | 4 | 4 | 78 | 434 | TRUE |
| 405 | 9 | 3 | 3 | 81 | 431 | TRUE |
| 406 | 9 | 2 | 2 | 83 | 429 | TRUE |
| 407 | 9 | 1 | 1 | 84 | 428 | TRUE |

Figure 6:
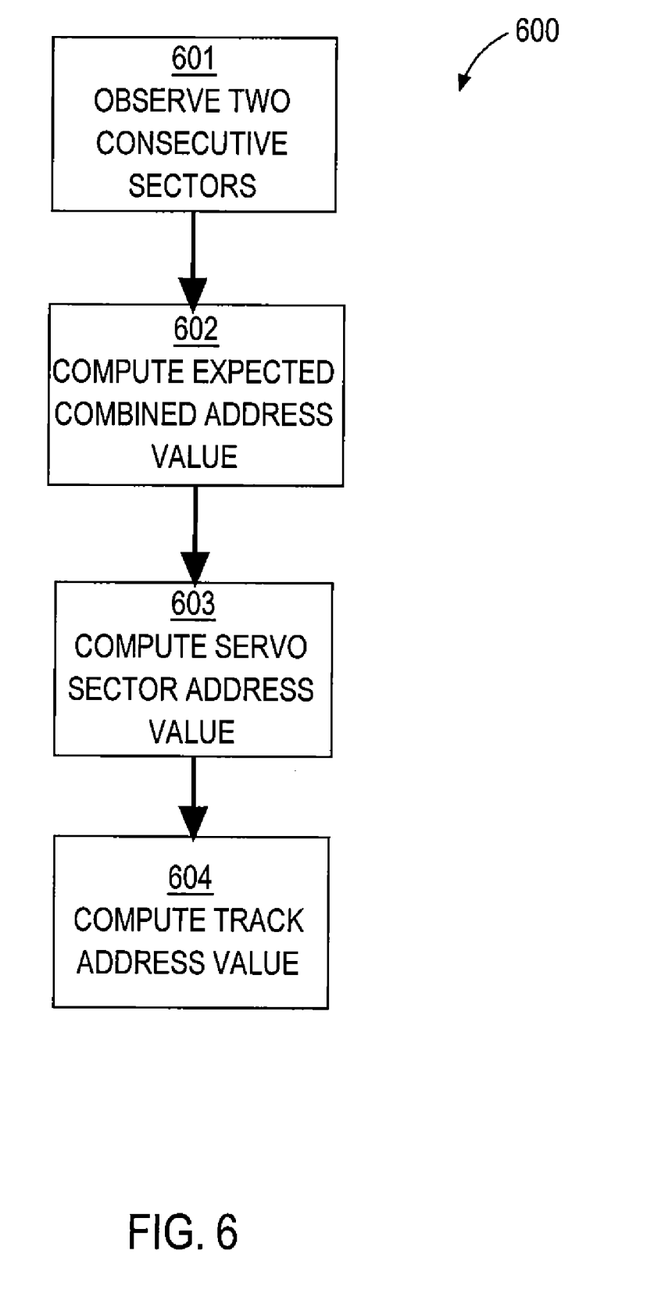
FIG. 6 is a flow chart that summarizes, in a stepwise fashion, a method for determining a position of a transducer head relative to a storage disk, according to an embodiment of the invention.

FIG. 6 is a flow chart that summarizes, in a stepwise fashion, a method 600 for determining a position of a transducer head relative to a storage disk, according to an embodiment of the invention. Method 600 is described in terms of a disk drive substantially similar to disk drive 110 in FIG. 1. However, other disk drives may also benefit from the use of method 600. The commands for carrying out steps 601-605 may reside in the disk drive control algorithm and/or as values stored in the electronic circuits of the disk drive or on the storage disk itself.

In step 601, the combined address value 510 is observed for two consecutive sectors on storage disk 112, i.e., tau(t2, s) and tau(t1, s−1). As noted above, each sector may be disposed on a different track of storage disk 112.

In step 602, an expected combined address value 510, i.e., $tau_{exp}$, is computed using Equation 4 and an estimate of the radial velocity of read/write head 127 as it traveled between the two sectors during step 601.

In step 603, given the expected combined address value 510 computed in step 602, i.e., $tau_{exp}$, Equations 6A, 6B, can be used to determine servo sector address value 501 for one of the two sectors observed in step 601, i.e., sector (t2, s).

In step 604, given servo sector address value 501 determined in step 603, Equation 7 is used to compute track address value 502 for the sector (t2, s).

By way of validation, Table 2 provides sample output of method 600, including decoded sector and track numbers. For generating Table 2, the number of cylinder bits L was 19, the number of sector bits S was 9, the number of sectors N was 400, the value of c used was 3, the actual velocity of the read head was 550 tracks/sector, and the estimated radial velocity was 250 tracks/sector. Because the wrap point between sector numbers 399 and 0 is of particular interest with respect to embodiments of the invention, results for sectors 391-13 are illustrated in Table 2. As shown, the decoded track numbers match the actual track numbers and the decoded sector numbers match the actual sector numbers.

TABLE 2

| | | Encoding | | Decoding | | | |
|---|---|---|---|---|---|---|---|
| actual track # | actual sector # | munged sector number m(s) | munged cylinder/sector number tau(t, s) | expected munged cylinder/sector number tau_exp(t2, s − 1) | decoded sector # | decoded munged sector # | decoded track # |
| 1000 | 391 | 500 | 513000 | | | | |
| 1550 | 392 | 383 | 393742 | 513550 | 392 | 383 | 1550 |
| 2100 | 393 | 267 | 275508 | 394292 | 393 | 267 | 2100 |
| 2650 | 394 | 152 | 158298 | 276058 | 394 | 152 | 2650 |
| 3200 | 395 | 38 | 42112 | 158848 | 395 | 38 | 3200 |
| 3750 | 396 | 437 | 451238 | 42662 | 396 | 437 | 3750 |
| 4300 | 397 | 325 | 337100 | 451788 | 397 | 325 | 4300 |
| 4850 | 398 | 214 | 223986 | 337650 | 398 | 214 | 4850 |
| 5400 | 399 | 104 | 111896 | 224536 | 399 | 104 | 5400 |
| 5950 | 0 | 3 | 9022 | 112446 | 0 | 3 | 5950 |
| 6500 | 1 | 7 | 13668 | 9572 | 1 | 7 | 6500 |
| 7050 | 2 | 12 | 19338 | 14218 | 2 | 12 | 7050 |
| 7600 | 3 | 18 | 26032 | 19888 | 3 | 18 | 7600 |
| 8150 | 4 | 25 | 33750 | 26582 | 4 | 25 | 8150 |
| 8700 | 5 | 33 | 42492 | 34300 | 5 | 33 | 8700 |
| 9250 | 6 | 42 | 52258 | 43042 | 6 | 42 | 9250 |
| 9800 | 7 | 52 | 63048 | 52808 | 7 | 52 | 9800 |
| 10350 | 8 | 63 | 74862 | 63598 | 8 | 63 | 10350 |
| 10900 | 9 | 75 | 87700 | 75412 | 9 | 75 | 10900 |
| 11450 | 10 | 88 | 101562 | 88250 | 10 | 88 | 11450 |
| 12000 | 11 | 102 | 116448 | 102112 | 11 | 102 | 12000 |
| 12550 | 12 | 117 | 132358 | 116998 | 12 | 117 | 12550 |
| 13100 | 13 | 133 | 149292 | 132908 | 13 | 133 | 13100 |

In sum, embodiments of the invention have the advantage of compressing a servo sector address field and a track address field into a combined address field that is substantially smaller than the two combined fields. Because the combined address field can be decoded by observing two consecutive sectors disposed on different tracks, the process of determining the position of a read/write head in a disk drive can be performed rapidly. In addition, because the formulas used to decode the combined address field according to embodiments of the invention principally involve multiplication and division by 2 and modulo and signed modulo operators with power of 2 modulus, solving such formulas is straightforward using binary computers. For example, multiplication and division by 2 simply require left and right shifts respectively, and the modulo operator with a power of 2 modulus requires a pair of logical or arithmetic shifts.

While the foregoing is directed to embodiments of the present invention, other and further embodiments of the invention may be devised without departing from the basic scope thereof, and the scope thereof is determined by the claims that follow.

I claim:

1. A method of decoding a sector number and a track number of a recording medium of a disk drive based on encoded data written on servo sectors of the recording medium, comprising the steps of:
consecutively reading first and second encoded data, the first encoded data from a first servo sector and the second encoded data from a second servo sector;
decoding an S-bit sector number from the first and second encoded data; and
decoding an L-bit track number from the first and second encoded data,
wherein each of the first and second encoded data contains less than (S+L) bits.

2. The method of claim 1, wherein first and second encoded data are read using a transducer head of the disk drive and the decoding of the S-bit sector number and the L-bit track number is also based on an estimated radial velocity of the transducer head at the time of the reading of the first and second encoded data.

3. The method of claim 2, wherein each of the first and second encoded data contains L bits.

4. The method of claim 3, wherein the first servo sector and the second servo sector are located on the same track.

5. The method of claim 3, wherein the first servo sector and the second servo sector are located on different tracks.

6. The method of claim 3, wherein the recording medium has N distinct servo sectors and the first servo sector represents the (N−1)-th servo sector and the second servo sector represents the 0-th servo sector.

7. The method of claim 6, wherein the first servo sector and the second servo sector are located on different tracks.

8. A non-transitory computer-readable storage medium comprising instructions for causing a controller of a disk drive to carry out the steps of:
consecutively reading first and second encoded data written on servo sectors of a recording medium of the disk drive, the first encoded data from a first servo sector and the second encoded data from a second servo sector;
decoding an S-bit sector number from the first and second encoded data; and
decoding an L-bit track number from the first and second encoded data, wherein each of the first and second encoded data contains less than (S+L) bits.

9. The non-transitory computer-readable storage medium of claim 8, wherein first and second encoded data are read using a transducer head of the disk drive and the decoding of the S-bit sector number and the L-bit track number is also based on an estimated radial velocity of the transducer head at the time of the reading of the first and second encoded data.

10. The non-transitory computer-readable storage medium of claim 9, wherein each of the first and second encoded data contains L bits.

11. The non-transitory computer-readable storage medium of claim 10, wherein the first servo sector and the second servo sector are located on the same track.

12. The non-transitory computer-readable storage medium of claim 10, wherein the first servo sector and the second servo sector are located on different tracks.

13. The non-transitory computer-readable storage medium of claim 10, wherein the recording medium has N distinct servo sectors and the first servo sector represents the (N−1)-th servo sector and the second servo sector represents the 0-th servo sector.

14. The non-transitory computer-readable storage medium of claim 13, wherein the first servo sector and the second servo sector are located on different tracks.

15. A disk drive that decodes a sector number and a track number of a recording medium based on encoded data written on servo sectors of the recording medium, comprising:
- a transducer head configured to consecutively read first and second encoded data, the first encoded data from a first servo sector and the second encoded data from a second servo sector;
- a first decoder configured to decode an S-bit sector number from the first and second encoded data; and
- a second decoder configured to decode an L-bit track number from the first and second encoded data, wherein each of the first and second encoded data contains less than (S+L) bits.

16. The disk drive of claim 15, wherein
the first decoder is configured to decode the S-bit sector number based on an estimated radial velocity of the transducer head at the time of the reading of the first encoded data, and
the second decoder is configured to decode the L-bit sector number based on an estimated radial velocity of the transducer head at the time of the reading of the second encoded data.

17. The disk drive of claim 16, wherein each of the first and second encoded data contains L bits.

18. The disk drive of claim 17, wherein the first servo sector and the second servo sector are located on the same track.

19. The disk drive of claim 17, wherein the first servo sector and the second servo sector are located on different tracks.

20. The disk drive of claim 17, wherein the recording medium has N distinct servo sectors and the first servo sector represents the (N−1)-th servo sector and the second servo sector represents the 0-th servo sector.

\* \* \* \* \*